United States Patent
Kawahito et al.

(10) Patent No.: US 10,042,787 B2
(45) Date of Patent: Aug. 7, 2018

(54) CONTROLLING DATA TRANSFER FOR DATA PROCESSING

(71) Applicant: International Business Machines Corporation, Armonk, NY (US)

(72) Inventors: Motohiro Kawahito, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/700,449

(22) Filed: Apr. 30, 2015

(65) Prior Publication Data

US 2016/0321201 A1 Nov. 3, 2016

(51) Int. Cl.
- *G06F 3/00* (2006.01)
- *G06F 13/16* (2006.01)
- *G06F 13/40* (2006.01)

(52) U.S. Cl.
CPC ...... *G06F 13/1673* (2013.01); *G06F 13/1642* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 2006/0123156 A1* | 6/2006 | Moir | ...... | G06F 9/466 710/33 |
| 2011/0078700 A1* | 3/2011 | Blackburn | ...... | G06F 9/505 718/105 |
| 2012/0311604 A1* | 12/2012 | Achterberg | ...... | G06F 9/52 718/107 |
| 2014/0310467 A1* | 10/2014 | Shalf | ...... | G06F 15/7825 711/119 |

FOREIGN PATENT DOCUMENTS

JP 2008135013 A 6/2008

OTHER PUBLICATIONS

English abstract of Japanese Patent JP2008135013A by Kato Hideyuki et al.; Hitachi (Accessed Apr. 2015).

\* cited by examiner

*Primary Examiner* — Scott Sun
(74) *Attorney, Agent, or Firm* — Vazken Alexanian; Michael J. Chang, LLC

(57) ABSTRACT

A computer-implemented method for controlling data transfer for data processing includes: receiving a data set by a first processor; storing the data set in a buffer by the first processor; and transferring, from the buffer to a queue by the first processor, a batch data set including all data sets stored in the buffer during a time interval, under a condition that the queue is not accessed by a second processor while the transferring is being performed, wherein the batch data set is to be processed by the second processor. In the method, the time interval is adjusted depending on a state of the queue.

18 Claims, 7 Drawing Sheets

US 10,042,787 B2

CONTROLLING DATA TRANSFER FOR DATA PROCESSING

FIELD OF THE INVENTION

The present invention relates to controlling data transfer for data processing, and more particularly, to computer-implemented techniques for controlling data transfer for data processing wherein batch data sets are placed in, and processed from, a queue based on a time interval that is adjustable depending on a state of the queue.

BACKGROUND OF THE INVENTION

Recently, various techniques have been proposed for controlling data transfer for data processing. However, there exists a need for efficient and effective data transfer techniques when processing large amounts of data.

SUMMARY OF THE INVENTION

According to an embodiment of the present invention, there is provided a computer-implemented method for controlling data transfer for data processing. A first processor receives a data set. The first processor stores the data set in a buffer. The first processor transfers, from the buffer to a queue, a batch data set including all data sets stored in the buffer during a time interval, under a condition that the queue is not accessed by a second processor. The batch data set is to be processed by the second processor. In the embodiment, the time interval is adjusted depending on a state of the queue.

According to another embodiment of the present invention, there is provided an apparatus for controlling data transfer for data processing. The apparatus includes a processor, a buffer coupled to the processor and a memory coupled to the processor. In the apparatus, the memory includes instructions. When executed by the processor, the instructions cause the processor to receive a data set. When executed by the processor, the instructions cause the processor to store the data set in the buffer. When executed by the processor, the instructions cause the processor to transfer, from the buffer to a queue, a batch data set including all data sets stored in the buffer during a time interval, under a condition that the queue is not accessed by another processor. The batch data set is to be processed by the another processor. In the another embodiment, the time interval is adjusted depending on a state of the queue.

According to yet another embodiment of the present invention, there is provided a computer program product for controlling data transfer for data processing. The computer program product includes a computer readable storage medium having program instructions embodied with the computer readable storage medium. The program instructions are executable by a processor to cause the processor to receive a data set. The program instructions are executable by a processor to cause the processor to store the data set in a buffer. The program instructions are executable by a processor to cause the processor to transfer, from the buffer to a queue, a batch data set including all data sets stored in the buffer during a time interval, under a condition that the queue is not accessed by another processor. The batch data set is to be processed by the another processor. In the yet another embodiment, the time interval is adjusted depending on a state of the queue.

A more complete understanding of the present invention, as well as further features and advantages of the present invention, will be obtained by reference to the following detailed description and drawings.

DETAILED DESCRIPTION OF PREFERRED EMBODIMENTS

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for the purpose of illustration, and do not show actual dimensions.

Figure 1:
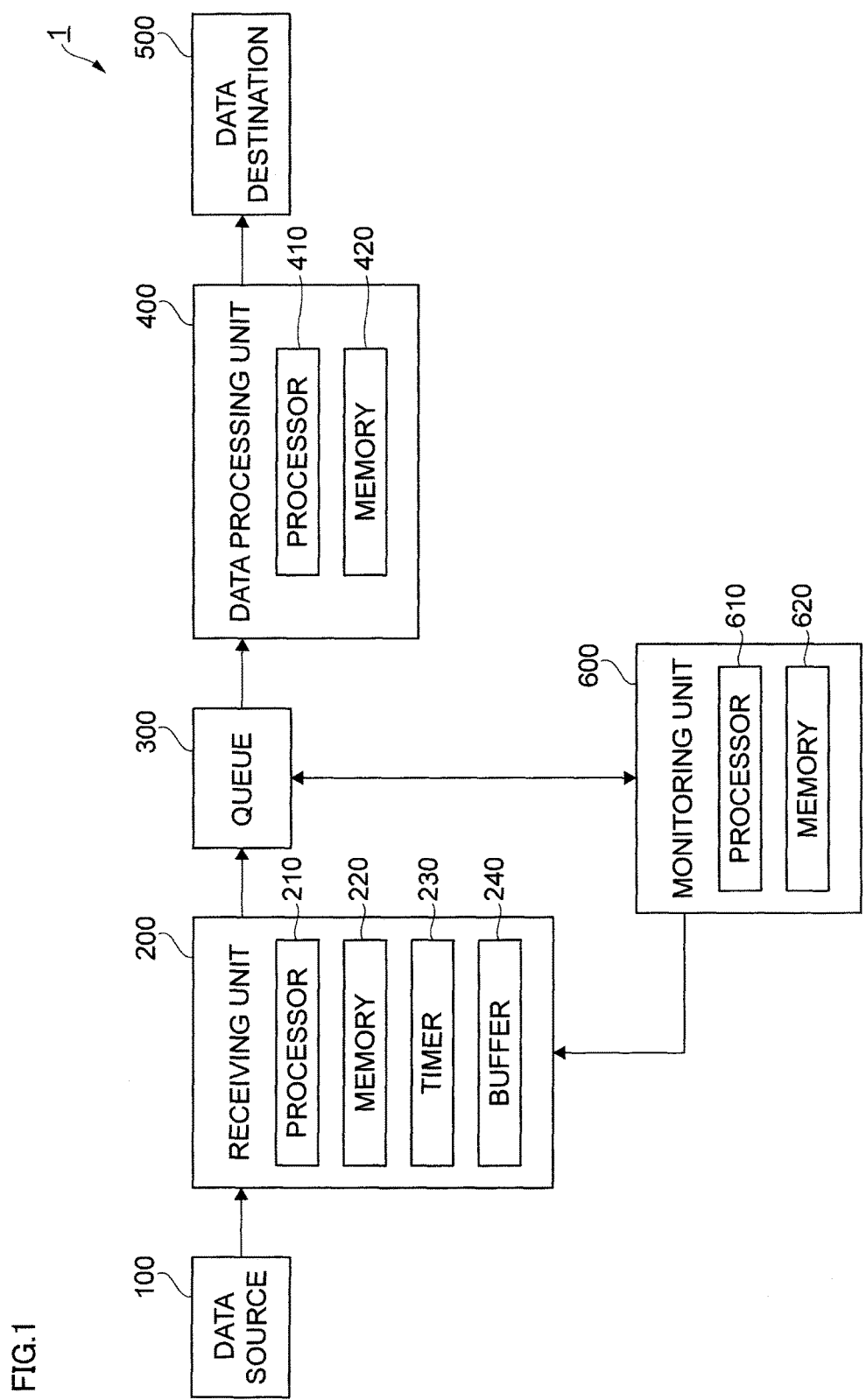
FIG. 1 depicts a block diagram of a computer system according to an embodiment of the present invention.

Referring to FIG. 1, there is shown a block diagram of a computer system 1 according to an embodiment of the present invention. As shown in the figure, the computer system 1 includes a data source 100, a receiving unit 200, a queue 300, a data processing unit 400, a data destination 500, and a monitoring unit 600.

Since this computer system 1 is assumed to receive and process a huge amount of data, the receiving unit 200 and the data processing unit 400 are required to be assigned to different processors. Thus, the receiving unit 200 and the data processing unit 400 include a processor 210 as an example of the first processor and a processor 410 as an example of the second processor, respectively. The receiving unit 200 further includes a memory 220, a timer 230 and a buffer 240, and the data processing unit 400 further includes a memory 420.

Although not necessarily required, the monitoring unit 600 is preferably assigned to a different processor from the processor 210 and processor 410. Thus, the monitoring unit 600 includes a processor 610. The monitoring unit 600 further includes a memory 620.

The data source 100 is a set of objects that generate data sets to be processed by the data processing unit 400. The objects may be local computing devices such as smart meters, computers in financial markets, automobiles, and the like. The smart meters may generate data sets representing electric energy consumptions of offices or residences. The computers in financial markets may generate data sets representing pieces of market information such as stock prices, exchange rates, and the like. The automobiles may generate data sets representing automobile identifiers, average speeds, engine operating times, preferences of drivers, and the like.

The receiving unit 200 receives data sets from the data source 100, and accumulates the data sets in the buffer 240. When the timer 230 counts up a time interval indicated by data stored in the memory 220, the receiving unit 200 generates a batch data set by batching all data sets which have been accumulated in the buffer 240 during the time interval, and transfers the batch data set to the queue 300.

In the case of shortening the time interval, the data sets are transferred one by one to the data processing unit 400 via the queue 300 in the computer system 1. In this case, response time of the data processing unit 400 is the fastest. In the case of lengthening the time interval, the buffer 240 tends to hold plural data sets. In this case, the data processing unit 400 may process the data sets at a time in a batch process. As stated above, the receiving unit 200 is implemented by the processor 210.

The queue 300 is a storage area for storing batch data sets in order to hold the batch data sets waiting to be processed by the data processing unit 400. The queue 300 is accessed by the receiving unit 200 and the data processing unit 400. Thus, the receiving unit 200 acquires a lock of the queue 300 when enqueuing (i.e., adding to the queue) a batch data set to the queue 300, and data processing unit 400 acquires a lock of the queue 300 when dequeuing (i.e., removing from the queue) a batch data set from the queue 300. The computer system 1 has the property of the huge amount of data sets received by the receiving unit 200 and the light processing of the data processing unit 400. This property increases relatively the time of the locks.

The data processing unit 400 processes the batch data sets stored in the queue 300, and outputs a result of data processing to the data destination 500. The data processing unit 400 is assumed to process a large amount of data, for example, one million data sets per second in real time (however the amount of processing for one data set or batch of data sets is light—hence the light processing property of the data processing unit 400). The data processing unit 400 is, however, assumed to reduce the amount of the data through processing. Specifically, the data processing unit 400 may decrease the number of the data sets to several ten-thousandths. For example, when processing the data sets representing automobile identifiers, average speeds, engine operating times, preferences of drivers, and the like, the data processing unit 400 may output automobile identifiers identifying the automobiles in order to provide, to the drivers of the automobiles caught in a traffic jam, a service such as sending of coupons available for grocery stores the drivers frequently visit. By way of example only, in this regard the number of data sets can be reduced by selecting only automobiles whose conditions are (1) very slow speeds and (2) the driver frequently visits grocery stores. Although the data processing unit 400 reduces the amount of the data in most cases as described above, the data processing unit 400 may not greatly reduce the amount of the data through processing as exceptions.

As stated above, the data processing unit 400 is implemented by the processor 410. The data processing unit 400 may further include plural devices implemented by different processors and plural queues for storing data to be transferred between two of the plural devices.

The data destination 500 is a recipient of the result of data processing by the data processing unit 400. The recipient may be, for example, a service provider providing the aforementioned service.

The monitoring unit 600 monitors a load of the data processing unit 400, obtains information on the load, and determines the time interval depending on the information.

Processing executed by the data processing unit 400 is generally uncertain. It often happens, however, that the data processing unit 400 decreases the number of the data sets by a predetermined amount or more through statistical processing. For this reason, output of the data processing unit 400 is not appropriate for estimating the load of the data processing unit 400, and therefore the monitoring unit 600 obtains information on the load from the queue 300 storing data waiting for the data processing unit 400 to process the data.

The information on the load may include three values. The first value is the number of batch data sets that have arrived at the queue 300. The second value is the number of batch data sets stored in the queue 300. The third value is the difference between the number of batch data sets that have arrived this time around at the queue 300 and the number of batch data sets that have arrived last time around at the queue 300. To determine the time interval, the monitoring unit 600 may apply a PID (Proportional-Integral-Derivative) control algorithm using these three values. The PID control algorithm is a kind of feedback mechanism widely used in control engineering. This algorithm may include an equation "$PID = Kp \times P + Ki \times I + Kd \times D$" where P denotes the P (proportional) value, I denotes the I (integral) value, D denotes the D (derivative) value, Kp denotes the P (proportional) gain, Ki denotes the I (integral) gain, and Kd denotes the D (derivative) gain. In this embodiment, the monitoring unit 600 sets the P value to the first value, the I value to the second value, and the D value to the third value. Also, Kp, Ki and Kd are set in advance to appropriate values determined in a practical manner. The monitoring unit 600 calculates the PID value by the equation.

The monitoring unit 600 holds in the memory 620 a table containing correspondence between ranges of the PID value and time lengths of the time interval, as an example of information associating ranges of the load with time lengths. For example, the table indicates that a PID value range of "0" to "100" corresponds to a time length "0", a PID value range of "100" to "150" corresponds to a time length "1 millisecond", and a PID value range of "150" to "200" corresponds to a time length "2 milliseconds". By using the table, the monitoring unit 600 retrieves a time length corresponding to a range including the calculated PID value, and determines the retrieved time length as the time interval. More specifically, the monitoring unit 600 determines the time length "0" as the time interval when the calculated PID value falls in the range "0" to "100", the time length "1 millisecond" as the time interval when the calculated PID value falls in the range "100" to "150", and the time length "2 milliseconds" as the time interval when the calculated PID value falls in the range "150" to "200". Herein, the time length "0" indicates a mode in which the data sets are transferred one by one to the data processing unit 400.

In contrast, in the case where the data processing unit 400 does not decrease the number of the data sets by the predetermined amount or more through processing, the monitoring unit 600 may apply some kind of algorithm using a response time until the data processing unit 400 outputs a result, in order to determine the time interval.

The monitoring unit 600 adjusts the time interval by writing data indicating the time interval in the memory 220 of the receiving unit 200. The monitoring unit 600 also adjusts the size of data processed by the data processing unit 400 at a time, depending on the time interval. Specifically, if lengthening the time interval, the monitoring unit 600 reconfigures the batch data sets in the queue 300 on the basis of the lengthened time interval. For example, if changing the time interval from 2 milliseconds to 4 milliseconds, the monitoring unit 600 sends, to the queue 300, an instruction to handle a block of two batch data sets as one batch data set to be processed at a time by the data processing unit 400.

Figure 2:
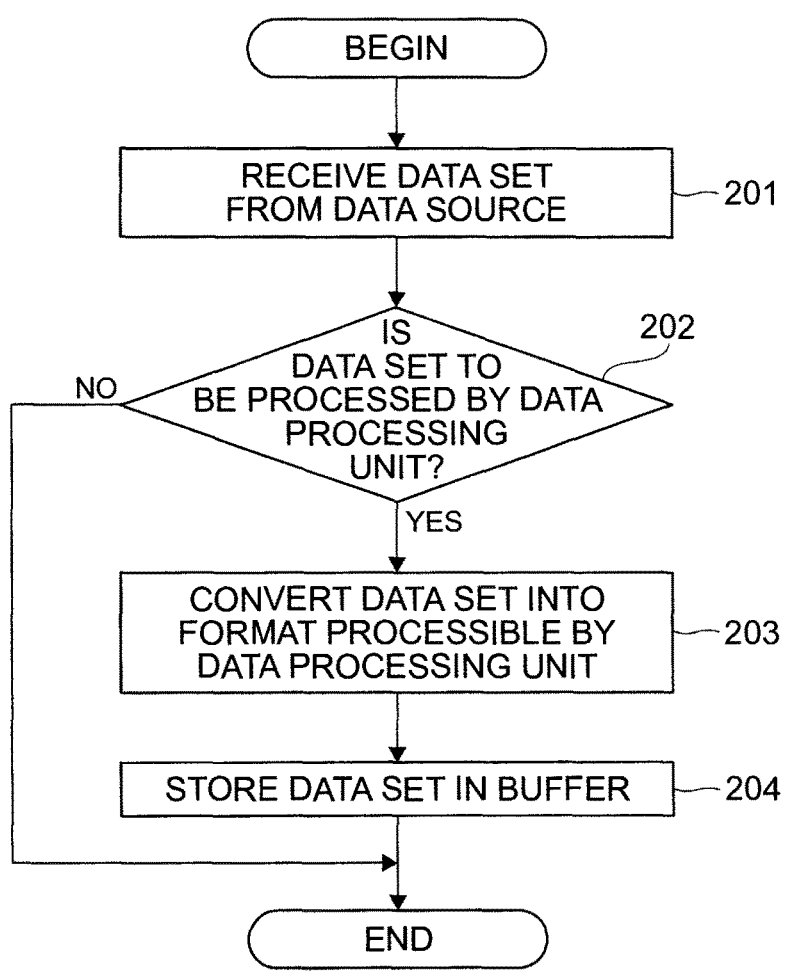
FIG. 2 depicts a flowchart representing an operation of a receiving unit in receiving data sets and storing the data sets in the buffer according to an embodiment of the present invention.

Referring now to FIG. 2, there is shown a flowchart representing an operation of the receiving unit 200 in receiving data sets and storing the data sets in the buffer 240 according to the embodiment of the present invention. As shown in the figure, the receiving unit 200 first receives a data set from the data source 100 (step 201). Next, the receiving unit 200 determines whether or not the data set is to be processed by the data processing unit 400 (step 202). If the data set is to be processed by the data processing unit 400, the receiving unit 200 converts the data set into a format processible by the data processing unit 400, if necessary (step 203). Then, the receiving unit 200 stores the data set with the format in the buffer 240 (step 204). If, at step 202, the data set is not to be processed by the data processing unit 400, the receiving unit 200 ends the process.

Figure 3:
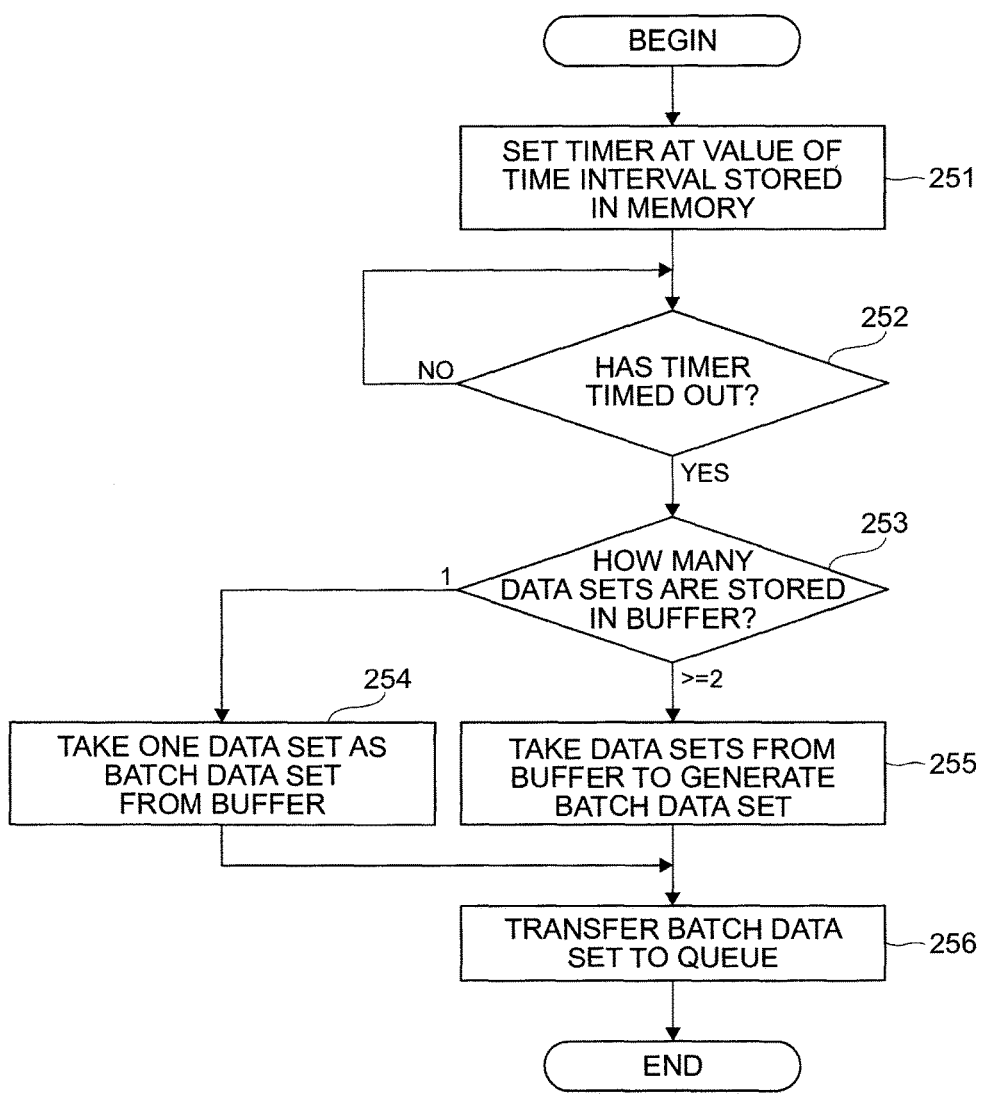
FIG. 3 depicts a flowchart representing an operation of the receiving unit in generating a batch data set and transferring the batch data set to the queue according to an embodiment of the present invention.

Referring now to FIG. 3, there is shown a flowchart representing an operation of the receiving unit 200 in generating a batch data set and transferring the batch data set to the queue 300 according to the embodiment of the present invention. As shown in the figure, the receiving unit 200 first sets the timer 230 at a value of the time interval stored in the memory 220 (step 251). Next, the receiving unit 200 determines whether or not the timer 230 has timed out (step 252). For example, in the case where the timer 230 is a countdown timer, the receiving unit 200 determines whether or not the timer 230 has reached zero. If the timer 230 has not timed out, the receiving unit 200 repeats step 252.

If, at step 252, the timer 230 has timed out, the receiving unit 200 further determines how many data sets are stored in the buffer 240 (step 253). If one data set is stored in, the buffer 240, the receiving unit 200 takes the data set from the buffer 240 (step 254). In this case, the receiving unit 200 handles the data set as a batch data set to be processed by the data processing unit 400. If, at step 253, two or more data sets are stored in the buffer 240, the receiving unit 200 takes the data sets, and generates a batch data set by batching the data sets (step 255). Finally, the receiving unit 200 transfers the batch data set to the queue 300 (step 256).

Figure 4:
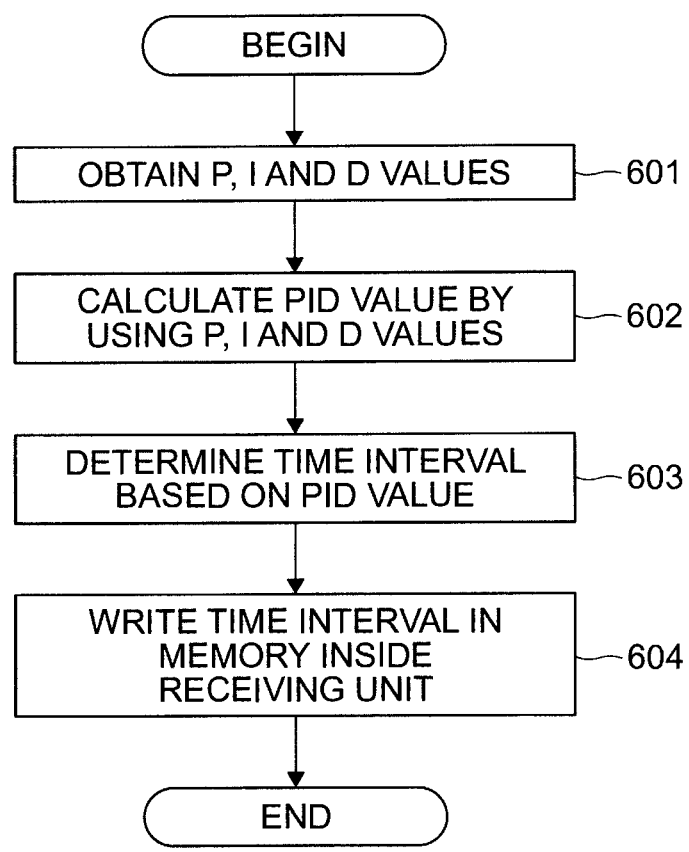
FIG. 4 depicts a flowchart representing an operation of a monitoring unit according to an embodiment of the present invention.

Referring now to FIG. 4, there is shown a flowchart representing an operation of the monitoring unit 600 according to the embodiment of the present invention. In the aforementioned explanation, it has been noted that the monitoring unit 600 may determine the time interval in two ways, namely: monitoring the state of the queue 300 and applying the PID control algorithm; and monitoring output of the data processing unit 400 and applying some kind of algorithm using the response time of the data processing unit 400. In the following explanation, however, the monitoring unit 600 is assumed to only use the former way to determine the time interval. Moreover, in the aforementioned explanation, the monitoring unit 600 is defined as a component to further adjust the size of a batch data set. In the following explanation, however, the monitoring unit 600 is assumed not to adjust the size of the batch data set.

As shown in the figure, the monitoring unit 600 first obtains the P value set at the first value, the I value set at the second value and the D value set at the third value by monitoring the queue 300 (step 601). Next, the monitoring unit 600 calculates the PID value by applying the PID control algorithm using the P, I and D values (step 602).

Subsequently, the monitoring unit 600 determines a time interval on the basis of the PID value (step 603). The monitoring unit 600 may determine the time interval, for example, by reference to the table containing correspondence between ranges of the PID value and time lengths of the time interval pre-stored in the memory 620. Finally, the monitoring unit 600 writes the time interval in the memory 220 inside the receiving unit 200 (step 604).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
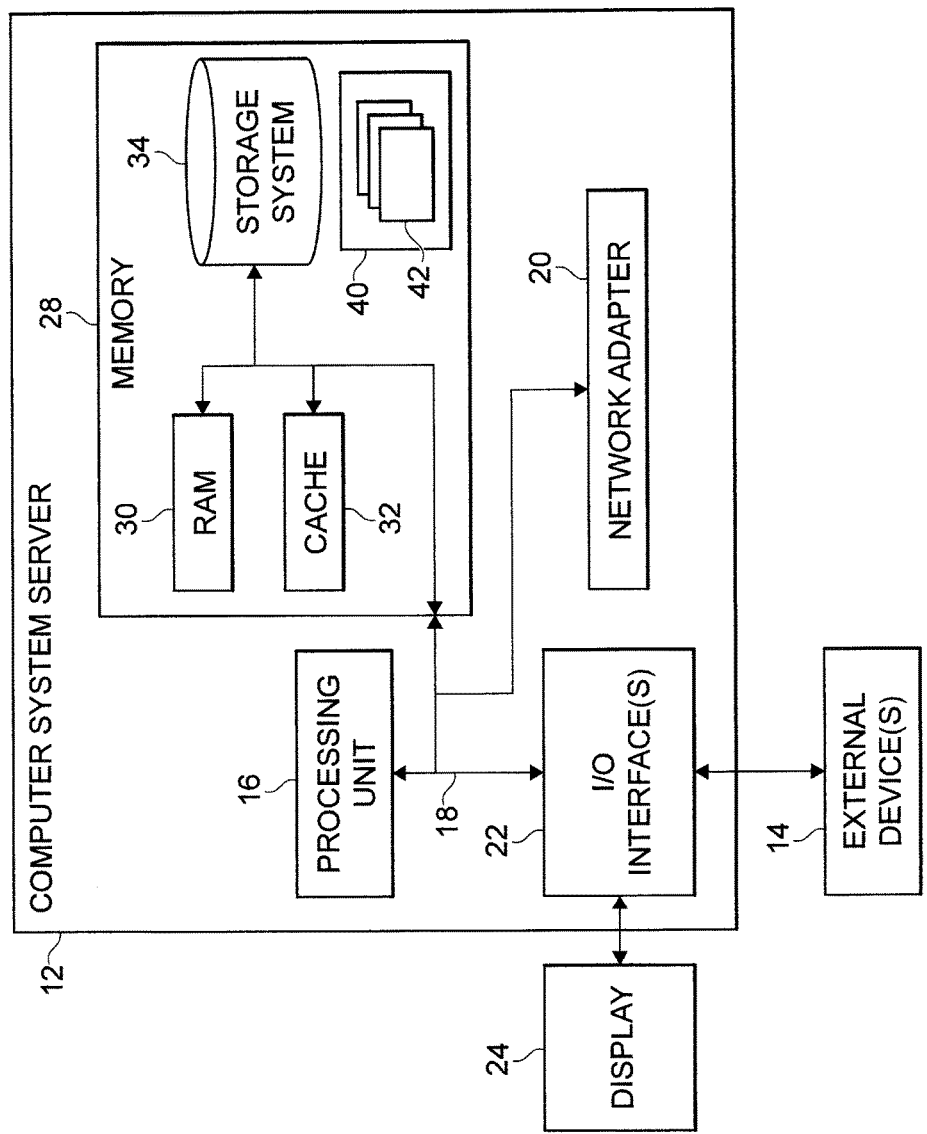
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
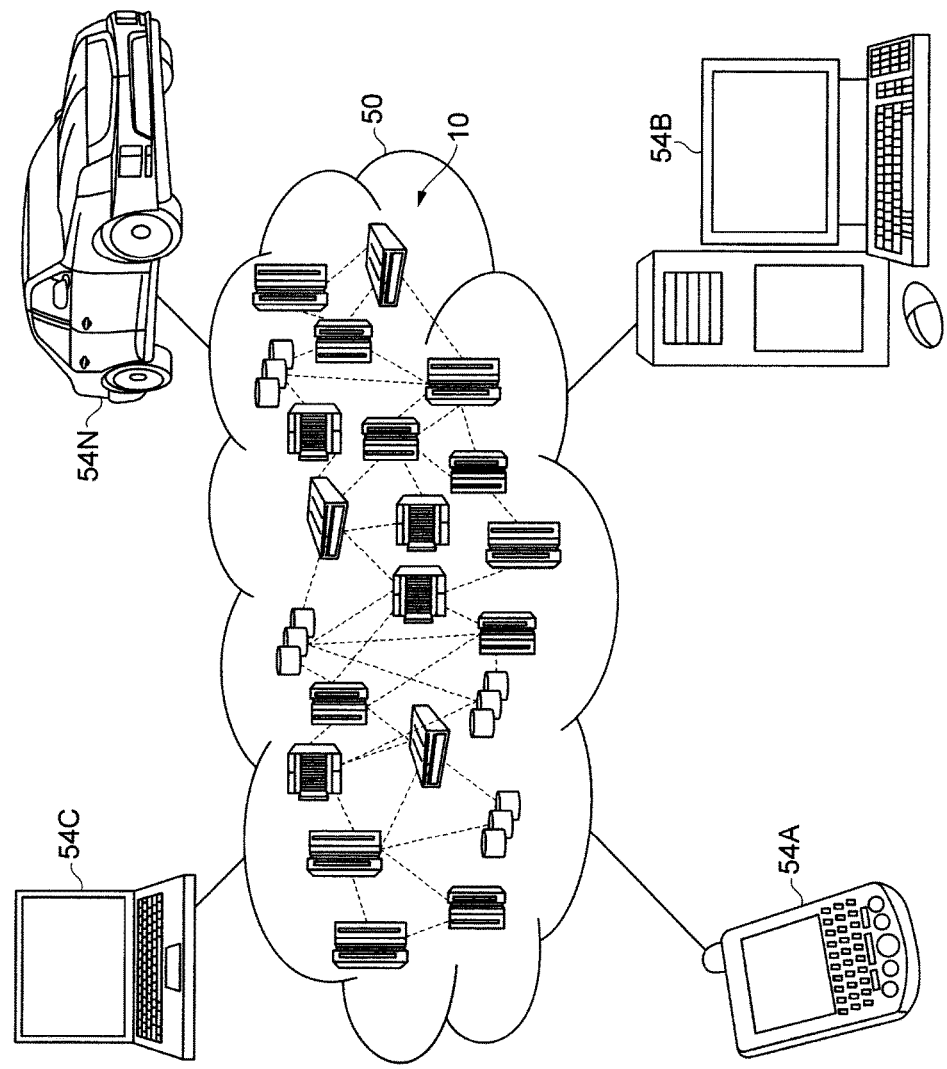
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
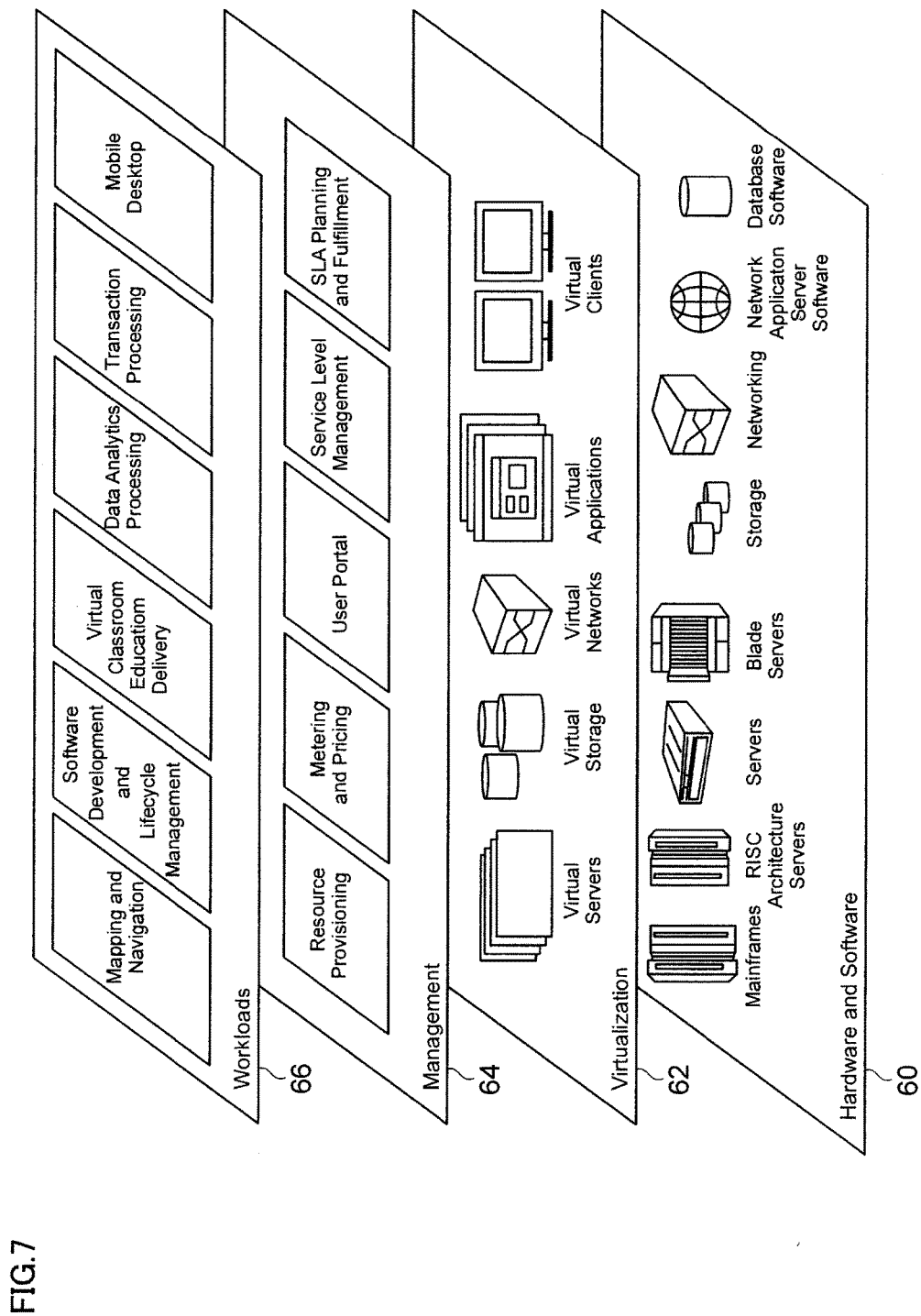
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for controlling data transfer for data processing, the method comprising:
   receiving a data set by a first processor;
   storing the data set in a buffer by the first processor; and
   transferring, from the buffer to a queue by the first processor, a batch data set including all data sets stored in the buffer during a time interval, under a condition that the queue is not accessed by a second processor while the transferring is being performed,
   wherein the batch data set is to be processed by the second processor, and wherein the method further comprises:
   adjusting, by a monitoring unit that monitors a load of the queue, the time interval depending on a state of the queue by i) obtaining information on the load of the queue including a difference between a number of the data sets transferred to the queue during a current time interval and the number of the data sets transferred to the queue during a previous time interval, and ii) determining the time interval using the information.

2. The method of claim 1, wherein the time interval is adjusted depending on a load of the queue, such that the time interval is increased when the load of the queue increases.

3. The method of claim 2, wherein the time interval is increased to a given time length selected out of a plurality of time lengths by reference to information in a correspondence table stored in the monitoring unit associating a plurality of ranges of the load with the plurality of time lengths.

4. The method of claim 1, wherein the time interval is adjusted depending on a load of the queue, such that the time interval is decreased when the load of the queue decreases.

5. The method of claim 4, wherein the time interval is decreased to a given time length selected out of a plurality of time lengths by reference to information in a correspondence table stored in the monitoring unit associating a plurality of ranges of the load with the plurality of time lengths.

6. The method of claim 1, further comprising:
   taking the batch data set from the queue by the second processor, under a condition that the queue is not accessed by the first processor; and
   processing the batch data set by the second processor.

7. The method of claim 6, wherein the time interval is adjusted depending on the state of the queue in a case where the second processor decreases an amount of the batch data set by a predetermined amount or more through processing the batch data set, and wherein the time interval is adjusted depending on a response time of processing by the second processor in a case where the second processor does not decrease the amount of the batch data set by the predetermined amount or more through processing the batch data set.

8. The method of claim 6, wherein
at least one of processing by the first processor and processing by the second processor is performed in a cloud environment.

9. An apparatus for controlling data transfer for data processing, comprising:
a processor;
a buffer coupled to the processor; and
a memory coupled to the processor,
wherein the memory comprises instructions which, when executed by the processor, cause the processor to:
receive a data set;
store the data set in the buffer; and
transfer, from the buffer to a queue, a batch data set including all data sets stored in the buffer during a time interval, under a condition that the queue is not accessed by another processor while the transfer is being performed, wherein the batch data set is to be processed by the other processor, and wherein the instructions further cause the processor to: adjust the time interval depending on a state of the queue by i) obtaining information on the load of the queue including a difference between a number of the data sets transferred to the queue during a current time interval and the number of the data sets transferred to the queue during a previous time interval, and ii) determining the time interval using the information.

10. The apparatus of claim 9, wherein the time interval is adjusted depending on a load of the queue, such that the time interval is increased when the load of the queue increases.

11. The apparatus of claim 10, wherein the time interval is increased to a given time length selected out of a plurality of time lengths by reference to information in a correspondence table associating a plurality of ranges of the load with the plurality of time lengths.

12. The apparatus of claim 9, wherein the time interval is adjusted depending on a load of the queue, such that the time interval is decreased when the load of the queue decreases.

13. The apparatus of claim 12, wherein the time interval is decreased to a given time length selected out of a plurality of time lengths by reference to information in a correspondence table associating a plurality of ranges of the load with the plurality of time lengths.

14. A computer program product for controlling data transfer for data processing, the computer program product comprising a computer readable storage medium having program instructions embodied therewith, the program instructions executable by a processor to cause the processor to:
receive a data set;
store the data set in a buffer; and
transfer, from the buffer to a queue, a batch data set including all data sets stored in the buffer during a time interval, under a condition that the queue is not accessed by another processor while the transfer is being performed, wherein the batch data set is to be processed by the other processor, and wherein the program instructions further cause the processor to: adjust the time depending on a state of the queue by i) obtaining information on the load of the queue including a difference between a number of the data sets transferred to the queue during a current time interval and the number of the data sets transferred to the queue during a previous time interval, and ii) determining the time interval using the information.

15. The computer program product of claim 14, wherein the time interval is adjusted depending on a load of the queue, such that the time interval is increased when the load of the queue increases.

16. The computer program product of claim 15, wherein the time interval is increased to a given time length selected out of a plurality of time lengths by reference to information in a correspondence table associating a plurality of ranges of the load with the plurality of time lengths.

17. The computer program product of claim 14, wherein the time interval is adjusted depending on a load of the queue, such that the time interval is decreased when the load of the queue decreases.

18. The computer program product of claim 17, wherein the time interval is decreased to a given time length selected out of a plurality of time lengths by reference to information in a correspondence table associating a plurality of ranges of the load with the plurality of time lengths.

* * * * *